US010268347B2

(12) United States Patent
Lavonen et al.

(10) Patent No.: US 10,268,347 B2
(45) Date of Patent: Apr. 23, 2019

(54) DISPLAY AREA WIDE CONTROL AREA

(71) Applicant: Trimble Solutions Corporation, Espoo (FI)

(72) Inventors: Jukka Lavonen, Helsinki (FI); Teemu Heikkonen, Vantaa (FI); Liisa Kause, Espoo (FI); Justiina Heilimo, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 178 days.

(21) Appl. No.: 15/397,173

(22) Filed: Jan. 3, 2017

(65) Prior Publication Data
US 2017/0192632 A1 Jul. 6, 2017

(30) Foreign Application Priority Data
Jan. 4, 2016 (FI) ...................... 20165001

(51) Int. Cl.
G06F 3/0481 (2013.01)
G06F 3/0482 (2013.01)
G06F 3/0484 (2013.01)
G06F 3/0485 (2013.01)

(52) U.S. Cl.
CPC .......... G06F 3/0482 (2013.01); G06F 3/0481 (2013.01); G06F 3/0485 (2013.01); G06F 3/04845 (2013.01); G06F 2203/04803 (2013.01)

(58) Field of Classification Search
CPC .. G06F 3/0482; G06F 3/0481; G06F 3/04845; G06F 3/0485
See application file for complete search history.

(56) References Cited

U.S. PATENT DOCUMENTS

| 8,775,965 | B1 | 7/2014 | Murphy et al. |
| 2009/0217192 | A1 | 8/2009 | Jensen et al. |
| 2015/0058787 | A1* | 2/2015 | Trainor .................. G06F 3/017 715/777 |
| 2015/0212670 | A1 | 7/2015 | Stade et al. |

(Continued)

FOREIGN PATENT DOCUMENTS

| EP | 2811385 A2 | 12/2014 |
| WO | 2015191800 A1 | 12/2015 |

OTHER PUBLICATIONS

"International Search Report of Finnish Application No. 20165001, dated Apr. 22, 2016, 2 pages".

(Continued)

Primary Examiner — Angie M Badawi
(74) Attorney, Agent, or Firm — Kilpatrick Townsend and Stockton

(57) ABSTRACT

To facilitate selection of a control that defines one or more commands to be performed to data content, a control display structure for an application is introduced. According to the structure, in a display area of a running application on a graphical user interface at least a first link and a second link are displayed in link area, at least a first container comprising at least one or more controls that are associated with the first link, and the second container comprising at least one or more controls that are associated with the second link, in a container area, wherein the controls displayed are freely selectable.

20 Claims, 8 Drawing Sheets

(56) References Cited

U.S. PATENT DOCUMENTS

2015/0277708 A1* 10/2015 Rodrig ................ G06F 3/04842
                                                              715/777
2015/0363048 A1* 12/2015 Brown ................. G06F 3/0488
                                                              715/777

OTHER PUBLICATIONS

Wikipedia.Org., "Ribbon (Computing)" 4 Pages. Retrieved on Apr. 7, 2016.

* cited by examiner

DISPLAY AREA WIDE CONTROL AREA

RELATED APPLICATIONS

This application claims priority to Finnish Patent Application No. 20165001, filed on Jan. 4, 2016, the contents of which are incorporated herein by reference in their entirety for all purposes.

FIELD

The invention relates to graphical user interfaces, and particularly to displaying different controls.

BACKGROUND

Many applications, while running on a computer, display on a graphical user interface so called controls. A control enables a user to perform one or more commands on data content, such as a document, a drawing, or a model. For example, in a word processor application a control can enable a user to manipulate the appearance of text, insert tables, insert footnotes, create tables of content, add page numbers, review changes, and so on. In another example, in a 3D modeling application a control can enable a user to create a 3D model of a structure, such as a building by adding, deleting or otherwise manipulating different elements forming a model of the building, to create drawings from the model, and so on.

There are several ways to display the controls on the graphical user interface. For example, a menu, a toolbar or a ribbon may be used to display the controls. The menu is a list comprising different choices, typically listed in vertical way. The toolbar comprises a fixed set of selectable graphical buttons with icons associated with controls. The buttons are typically in a horizontal or vertical row. The ribbon is a kind of a hybrid of the menu and the toolbar, displaying a large collection of controls in a visual layout through a tabbed interface so that a single subset of controls that is associated with a currently selected tab are displayed.

SUMMARY

The invention relates to a method, a program product, an apparatus and a system which are characterized by what is stated in the independent claims. The preferred embodiments are disclosed in the dependent claims.

A general aspect introduces a control display structure for an application, the control display structure comprising tab-like links and a ribbon-like container area that is displayed essentially as wide as a display area of an application from one side to the other opposing side and may display as many link-specific containers at least partly as will fit to the container area. A container is for a link and comprises controls that are associated with the link.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

The present invention is applicable to any application that may be configured to display controls in a specific control display structure on a graphical user interface, and to any computing apparatus, or computing environment, configured to run such an application and to cause a display device to display the controls according to the specific display structure. Below different examples relating to the display structure(s) describe what is outputted/displayed to a user. Various programming techniques and manners of causing a display device to display information develop constantly. This may require extra changes in the invention. Consequently, all terms and expressions should be interpreted broadly, and they are intended to describe, not to restrict, the invention.

It should be appreciated that herein term "application" encompasses different versions, or configurations of an application, or different applications in an application suite, each of which may have their own set of controls, or at least different subsets of controls. For example, Tekla Structures is available in different configurations and localized environments, like engineering, steel detailing, drawings, each having their own set of controls.

Figure 1:
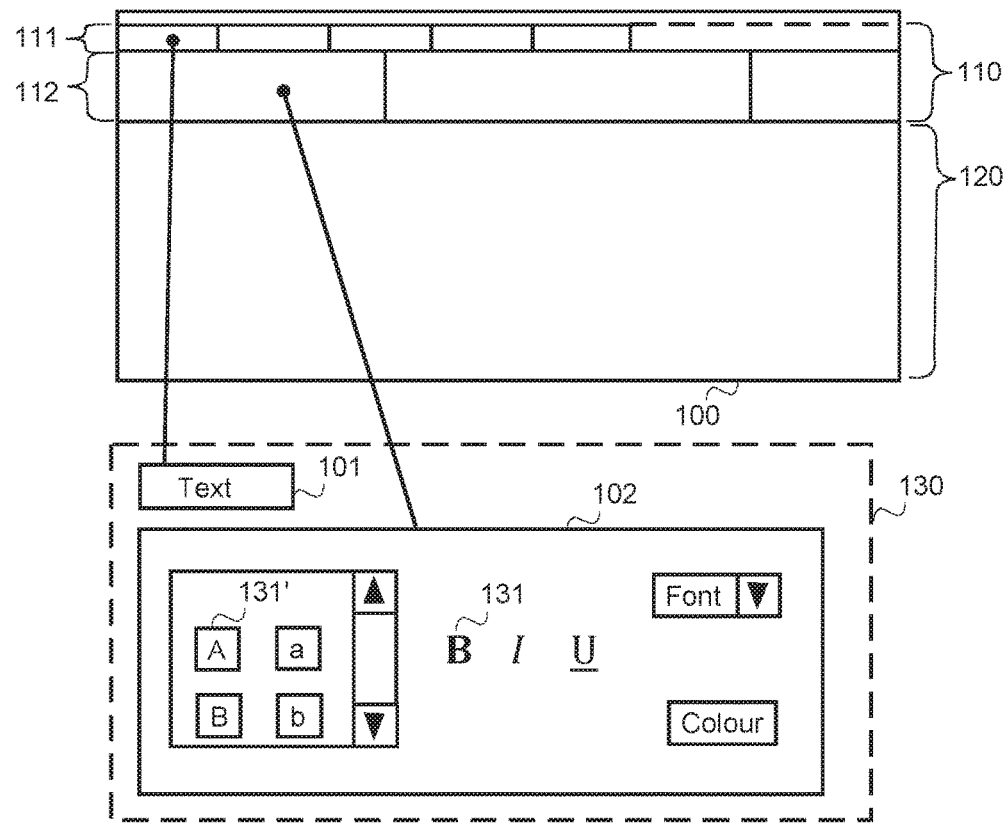
FIG. 1 is a block diagram illustrating elements forming a control display structure.

FIG. 1 illustrates a highly simplified display view 100. The display view 100 may be an application-specific display area whose size depends on a selected output size of the application: full size means that the display view fills a display size of a screen, or of screens if multiple screens are used, or of other corresponding display unit(s), on which the application is displayed, smaller size means that the display view fills only part of the display size. It should be appreciated that the display view may be outputted on one display device or on two or more display devices forming a display view. The display view 100 comprises a control display structure area 110 and a content area 120 (or data content area). The areas are in the illustrated example horizontal areas that are as wide as the display view of the application is in the horizontal direction. In other words, the areas extend between the left hand side and the right hand side of the display view. However, the areas may be vertical areas and in that case they are as wide (high) as the display view of the application is in the vertical direction. In that case the opposing sides between which the areas extend are the uppermost side and the lowest side. Further, it should be appreciated that the display view of the application may comprise other areas, like an area received for a customized toolbar that contains only controls added by the user to the toolbar.

The control display structure (arrangement) is a ribbon-like structure, and below term "ribbon" is used instead of the control display structure. The ribbon area 110 comprises a link area 111 for displaying tab-like links and a container area 112 for displaying containers. The container area 112 is at least in principle as wide as the display area of the application, or the display area reserved for data content, and may display as many containers as will fit in the container area. However, it should be appreciated that the display width does not restrict, or limit, the width and/or amount of containers or controls; there may be a much longer "queue" of containers and/or links, most of which are not displayed because of the display width limit. In an embodiment, each container is pre-set to have a specific width, which is set so that when the width of the ribbon area (or the part of ribbon area received for containers) is divided by the container width, the result is a whole number "X". Then the container area displays X of Y containers. Typically the number of containers is higher than what can be displayed at a time, so typically X<Y. However, in rare cases it may be that X=Y, in which case all containers may be displayed at a time. The width of the container area is preferably, but not necessarily, defined assuming full screen display mode of the application, in which case, in a non-full screen display mode of the application, less than X containers are displayed. However, in other embodiments the width of a container may vary from a container to a container, the number of displayed containers will vary, and it may be that only part of a container, i.e. container's controls/items/tools, is displayed since there is not room for the whole container, or nothing is displayed on a specific spot of a container area. For example, if the user has decided to hide one or more containers, non-displayed containers may be displayed or some of the area reserved for containers in the container area may be displayed as empty. If the user has hidden all containers it may be that the whole container area may be displayed as empty. Examples of other ways to define what is displayed, how hiding a container affects, and other examples in which some part of the container area may look empty will be described in more detail below.

As can be seen from the example illustrated in FIG. 1, the width of the link area may be smaller than the width of the container area. If the width of the link area is smaller than the width of the container area but the ribbon area is a rectangle, the free area may be left free or used for other purposes, for example to accommodate a ribbon search tool illustrated in FIG. 3B. However, the width of the link area may be set to be the same as the width of the container area so that there is no free area.

A basic element 130 for the ribbon comprises a link portion 101, and a container 102. The link portion 101 displays in a tab-like manner a link to the container 102. Typically in the link portion 101 a name describing operations performable by controls in the container is displayed. However, instead of the name, or in addition to the name, image information may be used. The name, or other information displayed on the link portion may be called also a title of the container, a container identifier, or a group identifier. The container 102 comprises a subset of all controls provided for the application, the subset being linked/grouped to a link identified in the link portion 101. In other words, the subset of controls that are associated with/connected to/bonded between/related to/combined with a link, either directly or via a container, as will be described in more detail below, are displayed in a container of the link. Typically a control is displayed using a button 131, 131', which usually contains an icon and has invisible borders, as button 131 in the illustrated example, and/or text. The buttons may be collected to groups or displayed as separate items. Further, a group comprising many controls may be displayed as a scrollable group, or as an extendable group. Hierarchical groups may be used as well. It should be appreciated that any way to allocate a subset of controls to a container, any way to organize them within the container and any way to display them may be used. Further, they may be manipulated according to known techniques.

Figure 2:
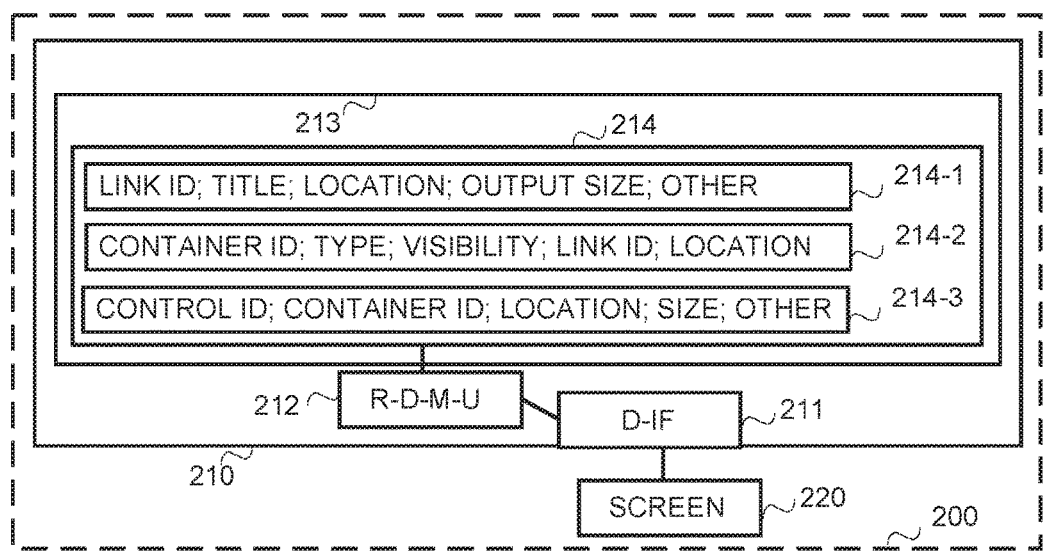
FIG. 2 shows a simplified architecture of an exemplary system and a schematic block diagram of an exemplary apparatus.

FIG. 2 illustrates a simplified system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The system 200 illustrated in FIG. 2 is a simplified computing environment that comprises one or more apparatuses 210 (only one shown in FIG. 2) connected to one or more display devices 220 (only one shown in FIG. 2).

The apparatus 210 may be any computing apparatus that can be configured to run at least one application that is configurable to display controls in the ribbon-like structure on a display device 220. For that purpose the apparatus 210 comprises one or more display interfaces (D-IF) 211, a ribbon display management unit (R-D-M-U) 212, and in a memory 213 application-specific ribbon definitions 214. In the illustrated example, the ribbon definitions 214 for an application comprise three lists: a link list 214-1, a container list 214-2 and a control list 214-3.

The link list 214-1 contains entries associating an internal link identifier with its title (i.e. the displayed information, like the name and/or icon), its location in the link area, it's output size, and possible other information. The internal link identifier may be any identifier, like a number. It should be appreciated that if the internal link identifier is the same as the title, there is no need to have the information twice in the entry. The location may be given by means of an order number or by giving the link identifier of the preceding link (empty means first), or by giving a more exact location definition, like the first, the last, in the middle. It should be appreciated that any other way to give the location may be used. The output size may be given as an exact size (height and width or mere width if the link area definitions define the height). In solutions in which the output size depends on the title, a common rule for the output size may be used, in which case the entry may not contain output size information. An example of the other possible information includes an indication, whether or not the link is an active link. The link list may be maintained as an ordered list which lists the links in the order the links are to be displayed, in which case it is not necessary to have location information.

The container list 214-2 contains entries associating an internal container identifier with the container's type information, visibility information, an internal link identifier, and the container's location information. The internal container identifier may be any identifier, like a number or a name. The container's type may be one of the following, or any combination thereof: a sliding container, expandable container, scrollable container, fixed size container. The visibility information indicates whether or not the container is in a hidden mode, i.e. whether the container, or more precisely, its controls (items), is visible or hidden. The internal link identifier associates the container with the corresponding entry in the link list 214-1. In the illustrated example it is assumed that if there are no internal link identifiers, the container is a fixed container that has a fixed location. The fixed container may also be called a fixed space. Since in the illustrated examples the visibility of a container is set in the link area, it is assumed that a fixed container is always visible. However, when some other arrangement to set "visibility value" is used, a fixed container may also be hidden or visible. In the illustrated example, the location information indicates for a fixed container its fixed location. The location for a non-fixed container may be left out, i.e. not given, or given as an exact location, or any other way may be used. The location information, or some additional information may indicate an output size of the container, for example by given the location defining starting and ending point of the area reserved for the container (height and width or mere width if the link area definitions define the height). However, the size may be determined by using information in the control list. In the illustrated example it is assumed that a container associated with an active link is an active container, and hence the information is not maintained in the container list. Naturally such information, as well as other possible information may be associated with the container identifier in the container list.

The control list 214-3 contains entries associating an internal control identifier with an internal container identifier, location information, size information, and possible other information. The internal control identifier may be any kind of an identifier. The internal control identifier may also be a group identifier identifying a group of controls. The location information indicates wherein in the associated container the control is outputted. The size information indicate the output size of the control (or the group), i.e. its height and width. The other information may contain group information, what is outputted to display the control, a link to one or more commands to be performed on the data content on the content area, or the one or more commands, etc. It should be appreciated that the way how the controls, their grouping, their functionality, etc. are implemented in detail bears no significance to the invention, and therefore are not described in more detail herein.

It should be appreciated that the above described use of lists is just an example to organize the information used for determining what is displayed (outputted), and any other way to organize them may be used. Further, depending on an implementation other information may be needed or some pieces of the disclosed information may be left out. For example, the container list may be left out, in which case the control list may contain internal link identifiers and the link list may contain other information needed for a container, such as information on visibility, if hide/unhide is implemented.

The display device 220, or display devices, may be any kind of a screen or other display unit providing a graphical user interface, either external to the apparatus or integrated to the apparatus. Examples of such display devices include different screens, like a touchscreen, a display screen, a projection screen, a TV screen, and monitors, like a computer monitor and a portable display monitor.

The computer environment illustrated in FIG. 2 represents one example which may be implemented by one apparatus comprising also the screen/display device integrated. Examples of such apparatuses include a user terminal or a work station, such as a laptop, a smartphone, a personal computer, a tablet computer, a field device, an e-reading device, or a personal digital assistant (PDA), or a server, like a cloud server or a grid server. In larger systems, the apparatus may be a terminal and the memory may be a data storage with which the terminal communicates via a server. In such a system, the server may be configured to perform one or more of the ribbon display management unit functionalities. The data storage may be any kind of conventional or future data repository, including distributed and centralized storing of data, managed by any suitable management system forming part of the computing environment. An example of distributed storing includes a cloud-based storage in a cloud environment (which may be a public cloud, a community cloud, a private cloud, or a hybrid cloud, for example). The implementation of the data storage/memory, the manner how data is stored, retrieved and updated, and the location where functionalities relating to ribbon display management and the actual outputting/displaying are performed are irrelevant to the invention.

FIGS. 3A to 3E illustrate different examples on a displayed ribbon area of one application. As can be seen from the Figures, the specific arrangement creates a tool lounge for the controls (tools).

Figure 3A:
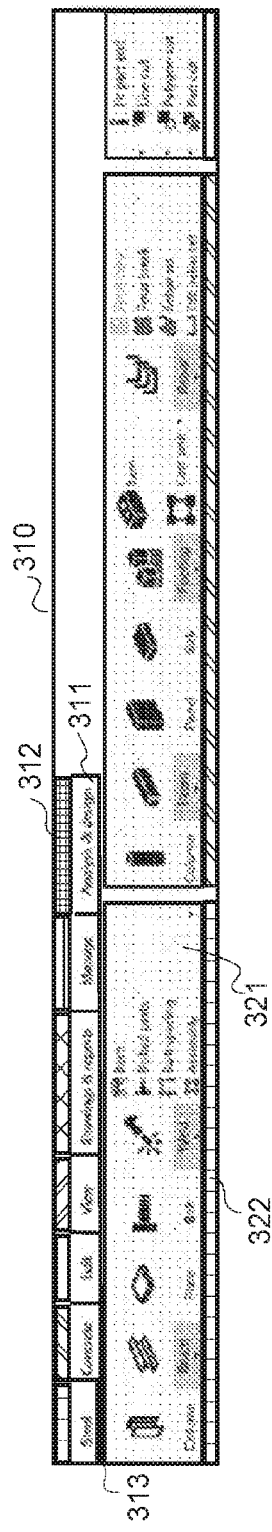
FIGS. 3A to 3E illustrate examples of displayed items.

In FIG. 3A the ribbon area 310 contains links and non-fixed containers. In the illustrated example, each link has a title 311 and a specific hatch area 312, and the active link further has a proportion line 313. Further, each displayed, or partly displayed, container 321 is associated with a specific hatch area 322.

The specific hatches 312, 322 in the link area and in the container area facilitate a user viewing the user interface to detect which container is associated with which link. To create hatches, specific hatch information either in the link information or in the container information can be used to create a hatch both to the link and the corresponding container. Naturally the information may be stored to both to the link information and the container information, or somewhere else. Instead of the specific hatches, or in addition thereto, different background colors and/or different text colors, or any other differentiating method may be used. However, it should be appreciated that no specific "link-container associating indicator output", like the hatches, needs to be defined and used, as will be evident from FIGS. 3B to 3E.

In the example the proportion line 313 shows which one of the links is an active link and it also indicates how big a part of a container associated with the active link is displayed. In the illustrated example of FIG. 3A the whole container is displayed, and the length of the proportion line is the same as the length reserved for the link in the link area. It should be appreciated that other ways to indicate which one of the links is the active link may be used as well. For example, the background color of the container and the link may be different for an active link, or the container and the link may be highlighted, or the container highlighted and link title to be bolded, or the non-active containers may be flatten (dimmed). Further, in another example, each link whose container is at least partly displayed may have a corresponding proportion line indicating how much of the container is displayed, as will be evident from FIGS. 3B to 3E.

Figure 3B:
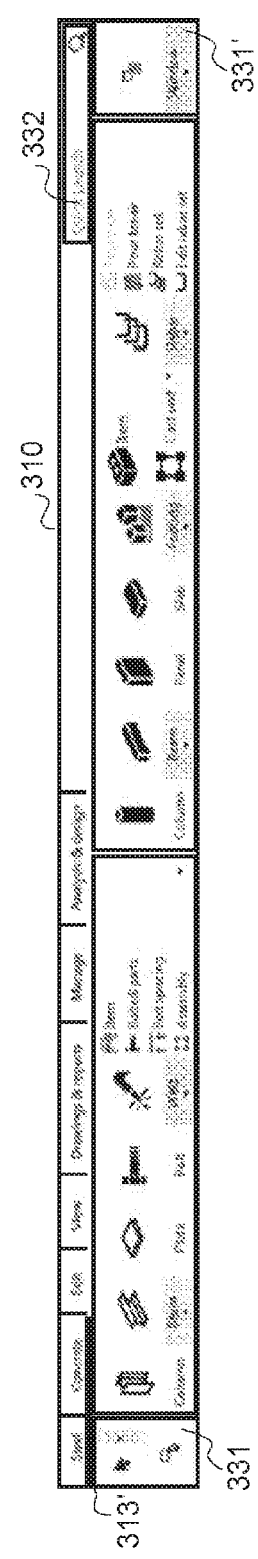

In FIG. 3B, the ribbon area 310 contains in addition to the ribbon area of FIG. 3A, two fixed containers 331, 331' in the container area, and an additional tool 332 above the container area in space where there no longer is links. In the illustrated example one of the fixed containers is fixed to the leftmost side and the other to the rightmost side. However, both of them could have been fixed to be side by side, and also any other position than the one illustrated may be used. Further, in the illustrated example the proportion line 313' indicates that the first two containers are displayed.

Figure 3C:
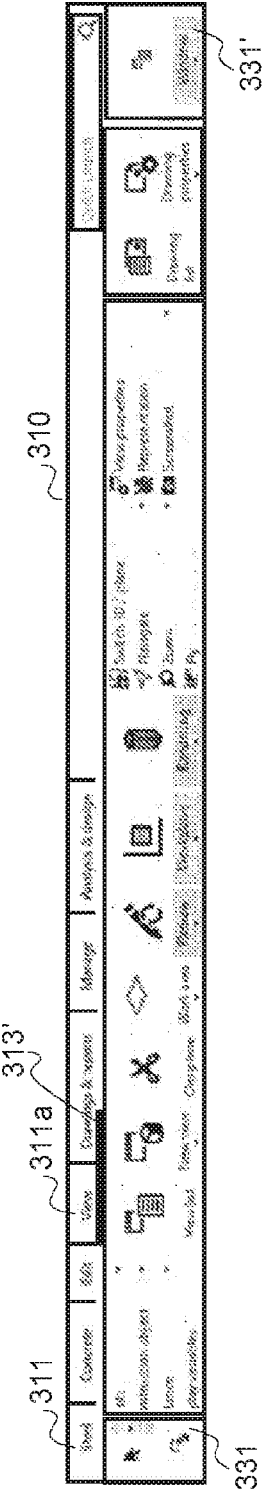

The ribbon area 310 in FIG. 3C illustrates an example what is displayed when the active link has been changed from link 311 (Steel), that was the active link in FIG. 3B, to be link 311*a* (View). As can be seen, for example by comparing FIGS. 3B and 3C, the fixed containers 331, 331' remain in their places, as well as the links, but the leftmost non-fixed container now is another container with different controls, i.e. those associated with the container associated with link 311a, and the remaining container area is updated correspondingly to display controls of containers associated with links after the link 311a, or at least as much of the container that will fit into the container area.

The ribbon area 310 in FIG. 3C may also illustrate an example what is displayed when the active link 311 (Steel), and two links after the active link have been hidden, in an embodiment in which the proportional line 313' indicates the displayed containers and how much of them is displayed but does not indicate an active container. Since the three first containers, calculating from the active one, are hidden ones they are not shown, but a first non-hidden container associated with a link 311a (View) is displayed, and the remaining container area is updated correspondingly to display controls of containers associated with links after the link 311a, or at least as much of the container that will fit into the container area. Further, although not depicted, in order to the user detect that the associated container is not displayed, a sign 314 indicating hidden may be displayed on the link area of the link, either permanently or in response to detecting a pointer, movable by user inputs, on the link area, and/or the container area may have a kind of container only displaying a sign indicating hidden. Depending on the implementation, clicking of the sign and/or the link may cause outputting the container.

Figure 3D:
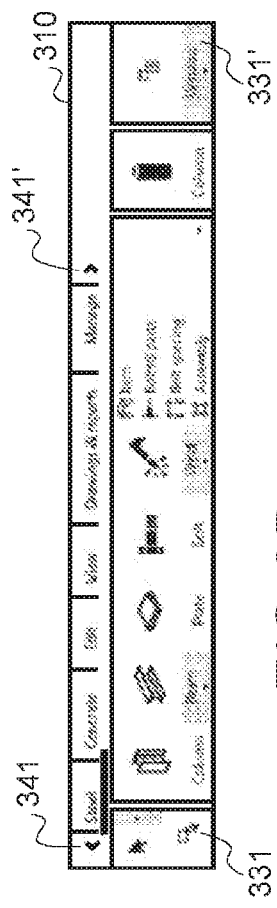

FIG. 3D illustrates what is displayed when the display width of the application, and hence the ribbon, is smaller than in FIGS. 3B and 3C. In the illustrated example, the size of outputted controls, and the size of the link titles remains the same, i.e. no size adjustment takes place. Further, as can be seen, in the illustrated example, when it is detected that not all link titles can be displayed, a scrolling aid for link titles, formed by two arrows, 341, 341' has been outputted in the link area. In the illustrated example, first the container area for the non-fixed containers is reduced, and as long as there is enough container area for the fixed containers, they will be not affected. However, it should be appreciated that also other rules may be used. For example, when the display width will be reduced, containers starting from the right hand side, or from the left hand side, or from the "reducing side" may be the ones affected. Maintaining the size of the link titles and container provides a user friendly solution in which the controls do not "jump" from one location to another, the ribbon area remains recognizable since it will be displayed with a similar (although less) content, and the learnability is supported. To summon up, in response to changing the display area size bigger in the perpendicular direction than the display area is divided, more containers will be outputted, and in response to making the display area smaller, less containers will be outputted. For example, in the example of FIG. 1 the display area is divided vertically, so the change in horizontal direction affects to what is displayed (outputted) in the container area, and it may affect to what is displayed in the link area, depending on the magnitude of the change.

Figure 3E:
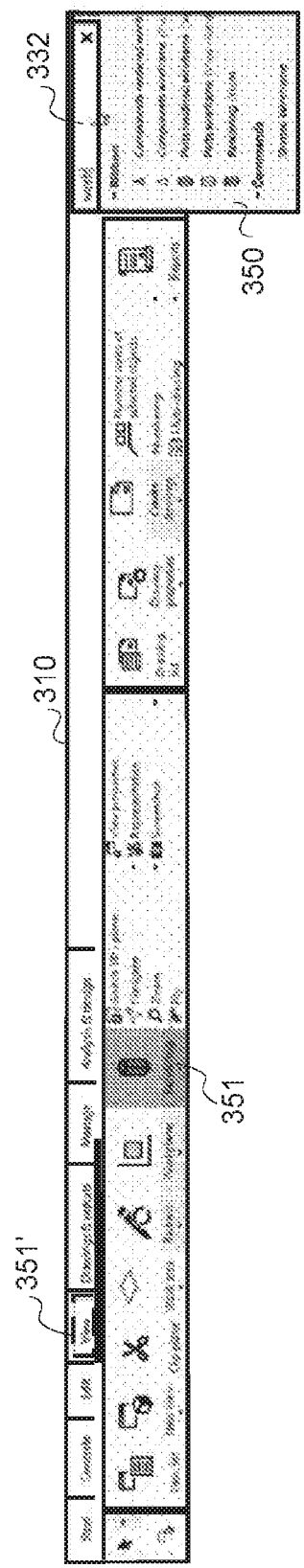

FIG. 3E illustrates an example what is displayed when the quick launch tool 332 is in use. When something has been inputted to an input area 332 of the tool, choices containing the inputted information are listed in a menu bar-like area 350. Further, in the illustrated example, a link 351' comprising corresponding control(s) or control groups is indicated by an indicator tool 351', and the control, or actually the control group 351 in the illustrated example is also indicated by highlighting it. Further, the proportional line indicating the displayed containers in the container area hints in the illustrated example that below the menu bar area, a container relating to "Manage", i.e. second link after the link indicated by the indicator tool, is partly displayed. As can be seen from the FIG. 3E, finding a control is much easier, and hence the user can prepare a model, or a document, much more efficiently and faster.

Below different examples how to determine what is displayed/outputted/shown in the ribbon area are described. In the examples it is assumed that left aligning is used. In other words, it is assumed that non-fixed containers are aligned to the left so that the active non-fixed container is the leftmost non-fixed container. Assuming that the user has selected the container that comprises controls the user is most repeatedly using to be the active container, the data content manipulation is faster since the user more easily finds the controls. However, implementing examples described herein to other kind of alignments, like centering or aligning to the right, or aligning to the left only if the whole container area will have controls (items) to output, or any other kind of alignment rule, is a straightforward process for one skilled in the art. Therefore the examples are not repeated with different alignment rules. Further, in the examples it is assumed that a horizontal ribbon is used. The same principles described herein may be used for a vertical ribbon as well. Further, below term "output" "something" is used for the sake of clarity to mean that the ribbon display manager unit causes the display to display "something."

Figure 4A:
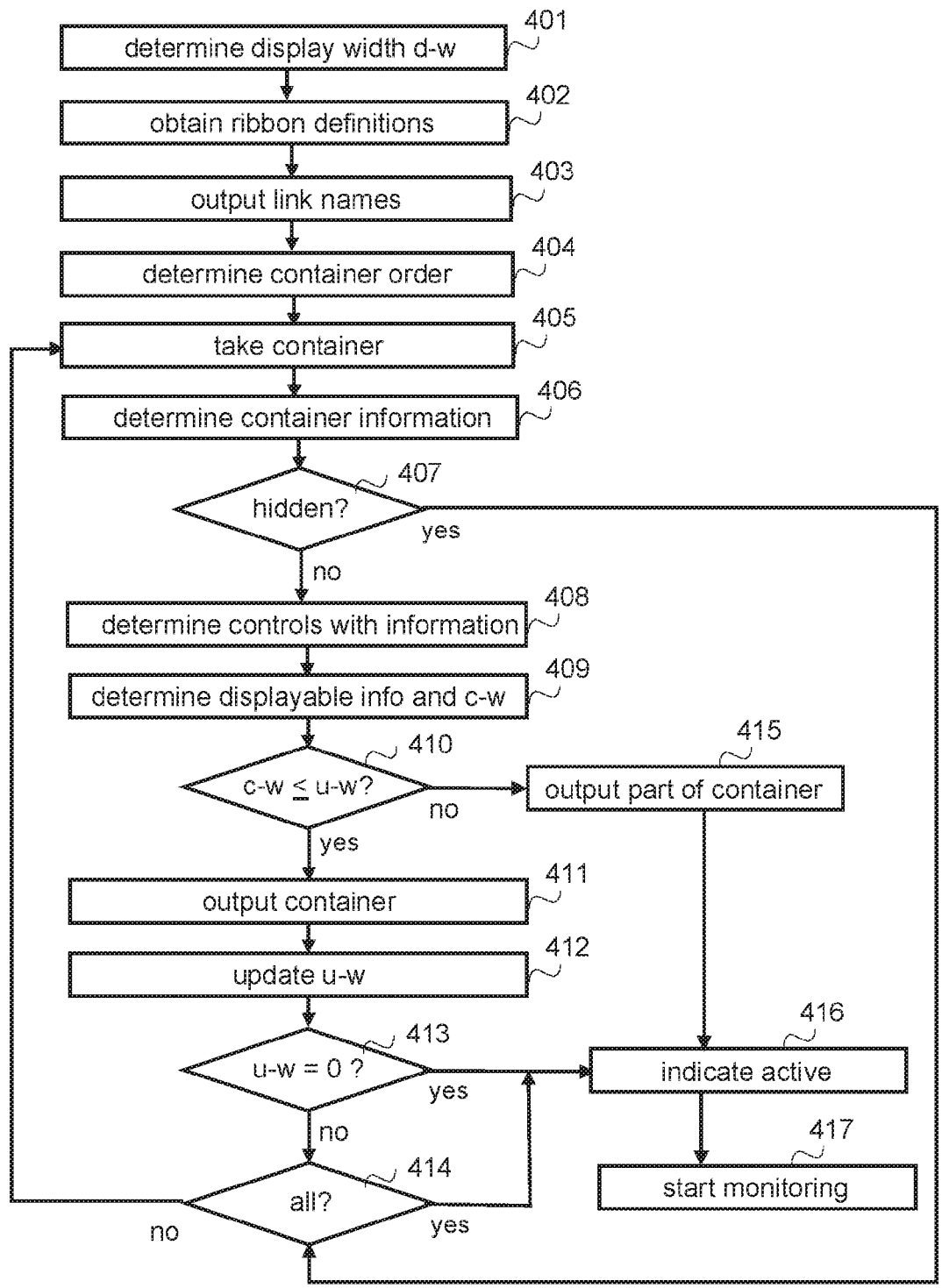
FIGS. 4A to 13 illustrate different exemplary functionalities.

FIG. 4A illustrates the functionality of the ribbon display manager unit when an application is started and the ribbon will be displayed. The result may be any of the ribbons illustrated with FIGS. 3A to 3E.

When the application is started, the ribbon display manager unit determines in step 401 the display width (d-w) of the application. In the illustrated example the display width of the application is also the maximum usable width of the container area. If the application is configured to use, when restarted, size settings that were on when the application was last time closed, then the size settings will be used to determine the display width. Naturally, also default size settings may be used, for example, if the application is started first time by a specific device. If the application is configured to use always specific size settings, then they will be used to determine the display width of the application. As said above, at this stage of the process, the display width is the same as usable width (u-w). The usable width is the width of the container area not yet occupied by containers. Further, the ribbon definitions of the application are obtained in step 402. In other words, the link list, the container list and the control list of the application are obtained (retrieved).

The link names are outputted in step 403 in the link area according to their order defined in the link list. Then the container order is determined in step 404. In the illustrated example those containers that are not associated with a link identifier are determined to have a higher priority to be outputted, and hence they are listed as first ones. If there are several of them, their internal order may be defined according to their order in the container list, and/or according to their location order. In the illustrated example, after that, or if there are no fixed containers, the order of the non-fixed containers is determined by putting the active container to be the first container, and then the remaining ones are ordered according to their link order. In other words, the link identifier of the active container is determined, and link identifiers succeeding the link identifier of the active container are determined, and associated containers are arranged to be in the same order. For example, if there are link#1, link#2, link#3, link#4, and link#5 and container#3 is the active one, link #3 is determined to be the first one, then the succeeding links, i.e. link#4 and link#5, are determined, resulting to a container order: container#3, container#4 and container#5. It should be appreciated that the above is only one example how to arrange the container order, and any rule or decision logic may be used. For example, the rule may be that the links form kind of a circular list, starting with the link corresponding to the active container, and ending up to the preceding link. Using the above example with such a rule would result to a container order: container#3, container#4, container#5, container #1, container#2. However, in both cases the link area would comprise the links in the same order, i.e. link#1, link#2, link#3, link#4, and link#5.

Once the container order is determined, a first container is taken in step 405 to be processed, and its container information is determined in step 406. If the container has not been set to be hidden (step 407), controls belonging to the container are determined in step 408, and using the control list information, like size, location, what to output, the displayable information (controls/items) of the container and the container width (c-w) required for the container are determined in step 409. Then the container width (c-w) is compared in step 410 with the usable width (u-w). If the container width is smaller than or equal to the usable width, the container is outputted in step 411 in its determined location, which for fixed containers has been given exactly, and for non-fixed depends on other containers. In the illustrated example, a non-fixed container is displayed right after the previous container. Naturally, if the container is the first one, its container is displayed starting from the left side of the display width. Then the usable width (u-w) is updated in step 412 by deducting the container width from the usable width. If the usable width is not, after the updating, zero (step 413), it is checked in step 414, whether or not all containers in the container order list determined in step 404 have undergone this "container output processing". If not, the process returns to step 405 to take the next container for the container output processing.

If the container width is bigger than the usable width (step 410), only part of the container is outputted in step 415. In other words, as much as possible is outputted, but since all do not fit, something will be left out.

Then the ribbon display manager unit indicates in step 416 the first non-fixed container and a corresponding link as an active ones and starts in step 417 to monitor input information on user input (selections) to detect selections that affect to what is displayed in the container area, and/or to react to the user input, as will be described in more detail below.

If the usable width is zero (step 413), or if all containers in the container order list determined in step 404 have undergone this "container output processing" (step 414), the ribbon display manager unit proceeds to step 416 to indicate the first non-fixed container and the corresponding link as the active ones.

If the container is a hidden one (step 407), the process proceeds to step 414 to determine whether or not all containers in the container order list determined in step 404 have undergone this "container output processing".

In the above described solution, the active container locates always in a predetermined location in the container area, the predetermined location depending on the location wherefrom the non-fixed containers, which will be displayed, are added to the container area, since the "adding" is started from the active container. As said above, in the example the predetermined location for the active container is the leftmost possible area for non-fixed containers.

Figure 4B:
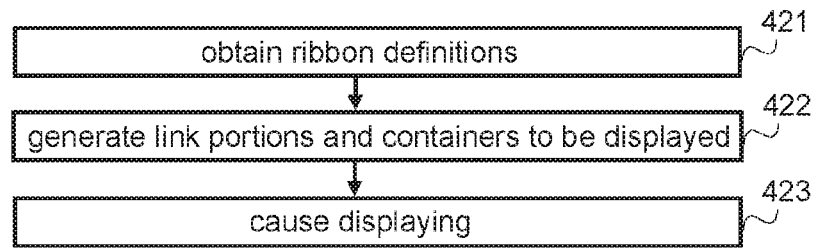

FIG. 4B illustrates in a more general level the functionality of the ribbon display manager unit when an application is started and the ribbon will eventually be displayed.

When the application is started, the ribbon definitions of the application are obtained in step 421. In other words, the link list, the container list and the control list of the application are obtained (retrieved). Then the link portions and corresponding containers are generated in step 422. More precisely, the link portions are generated according to the link order, and corresponding containers are generated in the same order, taking into account the hidden/non-hidden information, so that the end result, if it would fit to a display width, would contain all links and all containers, side by side. Once the link portions and the containers are generated, displaying as many of them that will fit into the display area is caused in step 423.

Naturally the above described general process description may be combined with the following description and the one described with FIG. 4A.

Figure 5:
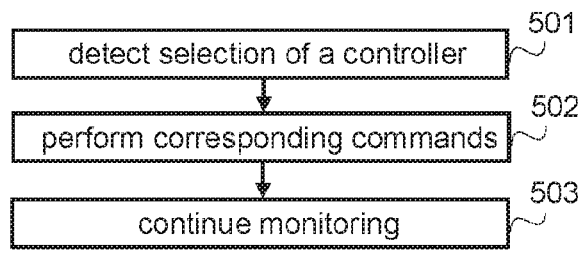

FIG. 5 illustrates functionality of the ribbon display manager unit in the monitoring phase according to an exemplary implementation in a situation in which monitoring detects a selection of a control.

Referring to FIG. 5, when a user input selecting a control displayed on the container area is detected in step 501, corresponding commands are performed in step 502 to the data content on the content area. Then the monitoring is continued in step 503.

The implementation explained with FIG. 5 differs from the known solutions by the fact that the user may freely select the control amongst visible, i.e. displayed, controls, regardless whether or not it is in an active container. In other words, a user can easily execute commands from adjacent links without a need to jump between the links. In prior art solution that is actually impossible since only those controls are displayed that belong to the container behind an active link or tab.

Figure 6:
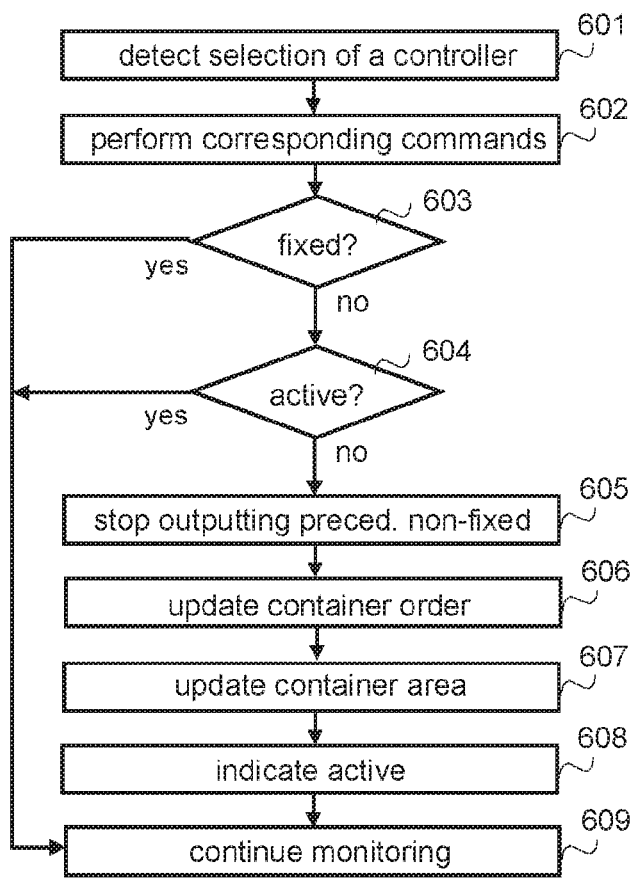

FIG. 6 illustrates functionality of the ribbon display manager unit in the monitoring phase according to another exemplary implementation in the situation in which monitoring detects a selection of a control.

Referring to FIG. 6, when a user input selecting a control displayed on the container area is detected in step 601, corresponding commands are performed in step 602 to the data content on the content area. Meanwhile it is checked, in step 603, whether or not the selected control locates in a fixed container.

If the selected control locates in a non-fixed container (step 603), it is checked in step 604 whether or not the selected control locates in the active container.

If the container is not the active one (step 604), it will be updated to be the active one, and the displayed container area is updated correspondingly. In the illustrated example the updating starts by stopping in step 605 outputting the preceding non-fixed containers, i.e. non-fixed containers that precede the container in which the selected control locates, and by updating in step 606 the container order. In the illustrated example the container order is updated by setting the container comprising the selected control to be the first in the order, followed by containers succeeding the container in the order of succession, and then adding to the end the preceding containers so that the previous first one will be the first to be added. When the container order has been updated, the outputted (displayed) container area is updated in step 607 by shifting (transferring) the remaining outputted containers so that the container comprising the selected control is aligned to the left (to the leftmost possible location if there are fixed containers in the left). Then the container order is used, starting from the first not outputted container, the usable width is determined, and rest of the container area display is updated by performing steps 405 to 415 described above with FIG. 4A, for example. Once the container area is updated, the link information associated with the container comprising the selected control is updated in step 608 to indicate active. Then the monitoring is continued in step 609.

If the selected control located in a fixed container (step 603), or in an active container (step 604), no update of displayed container area and active indication is needed and the process proceeds directly to step 609 to continue monitoring.

As is evident from the above, in the example of FIG. 5 a selection of a control has no impact on what is displayed on the container area, whereas in the example of FIG. 6, a selection of a control may trigger an update to what is displayed on the container area. If the ribbon illustrated in FIG. 3B is the one displayed in the beginning, and the selected control locates in the second non-fixed container, the ribbon area will remain the same when principles of FIG. 5 are implemented, whereas if the principles of FIG. 6 are implemented, the ribbon area will be updated to be the one displayed in FIG. 3C.

Figure 7:
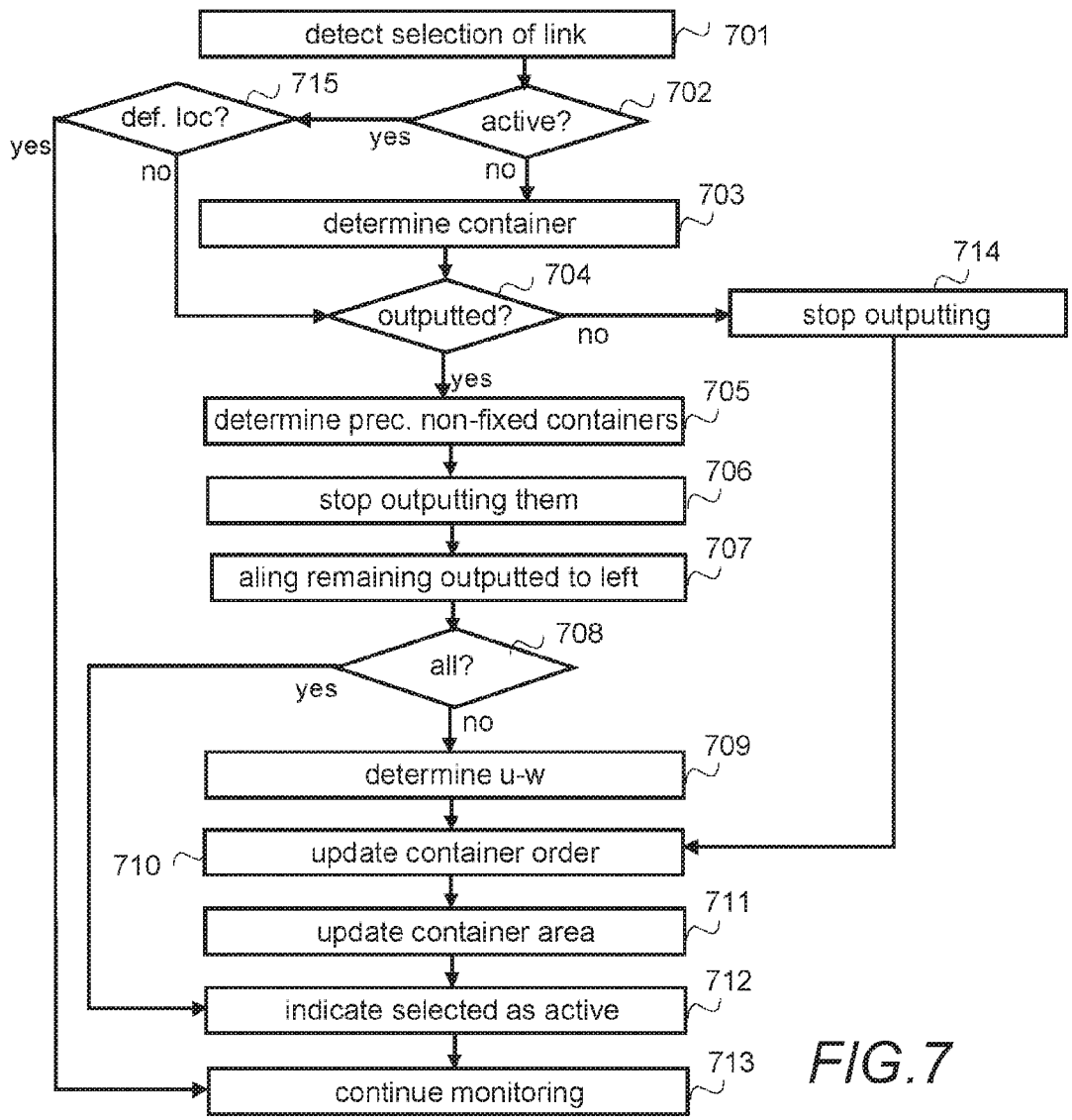

FIG. 7 illustrates an exemplary functionality of the ribbon display manager unit in a situation in which monitoring detects a selection of a link.

Referring to FIG. 7, when the selection of the link is detected in step 701, it is checked in step 702, whether or not the link is the active one. If not, the container assigned to the link is determined in step 703 using the container list, and then it is checked in step 704, whether or not the container, or part of it, is outputted.

If at least part of the container is outputted (step 704), preceding non-fixed containers are determined in step 705, and outputting them, or at least those of them that are (is) outputted, is stopped in step 706. Then the remaining outputted containers are aligned in step 707 to the left. Now the container corresponding to the selected link is the leftmost non-fixed container outputted.

Then it is checked in step 708, whether or not the previously outputted container area already displayed all possible containers in the container order, the last one at least partly. If not, the usable width (the width of the free area) of the container area is determined in step 709. Further, the container order, starting from the first non-outputted container succeeding the container associated with the selected link, is updated in step 710. Then the rest of the container area display is updated in step 711 by performing steps 405 to 415 described above with FIG. 4A, for example. Further, the link information is updated in step 712 so that the selected link is indicated to be the one that is active. Then the monitoring is continued in step 713.

If the previously outputted container area already displayed all possible containers (step 708), no further update of the container area display is performed in the illustrated example, and the process proceeds to step 712 to indicate the selected link as active.

If not even a part of the container is outputted (step 704), outputting of the container area is stopped in step 714, and the process proceeds to step 710 to update the container order, using the container associated with the selected link as the first one. Then the display of the container area is updated, as described above.

If the selected link is an active link (step 702), it is checked in step 715 whether or not the container is in the default location, i.e. aligned to the left. If yes, the container area display is not updated, and the process proceeds to step 713 to continue monitoring. If the container is not in the default location, the container area display is updated, and the process proceeds to step 704 to check, whether or not the container, or part of it, is outputted.

As can be seen, by selecting a link after a link, the user may scroll through all containers, and hence all controls. However, the user is able to see controls of more than one container at a time, so scrolling is faster because the user may select every second, third etc. link. This is especially useful when add-ins, having own links and only few controls per add-in, are supported. The user can easily use controls of a plurality of add-ins without scrolling.

Figure 8:
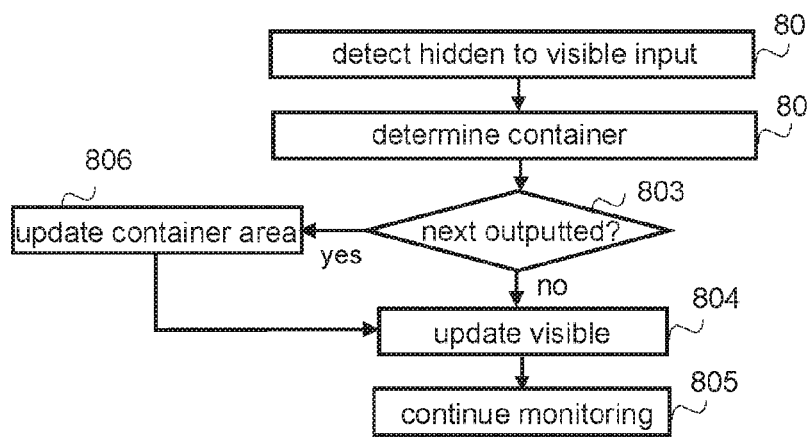

FIG. 8 illustrates an exemplary functionality of the ribbon display manager unit in a situation in which monitoring detects that a hidden container is set to be visible. In the illustrated example it is assumed that such change of setting also makes the container active, i.e. corresponds to selection of a link.

Referring to FIG. 8, when a user input setting a hidden container to be visible is detected in step 801, the container is determined in step 802. Once the container has been determined (step 802) it is checked in step 803 whether or not the succeeding container, or part of it, is displayed. If not, no updating of the container area is performed, the visibility information of the container is updated in step 804 to be visible (non-hidden) and the process proceeds to step 805 to continue monitoring. If at least part of the succeeding container is outputted (step 803), the container area is updated in step 806, either starting from the active container, or from the one changed to be visible again. The container area may be updated using any of the above described update principles. Then the process proceeds to step 804 to update the visibility information of the container.

In another exemplary implementation changing a hidden container to a visible container is interpreted to include making the container an active container. In the implementation, when a user input setting a hidden container to be visible is detected, the container is determined, the container is updated to be visible again, and the container area is updated in step, starting from the selected container, for example as described above with FIG. 7. Once the container area is updated, monitoring is continued.

Figure 9:
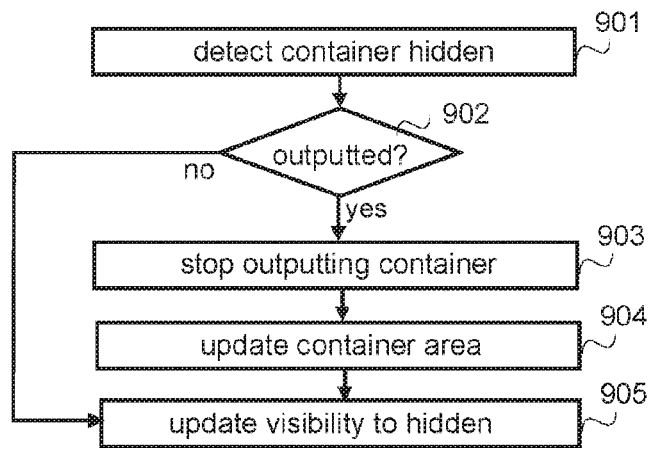

FIG. 9 illustrates an exemplary functionality of the ribbon display manager unit in a situation in which monitoring detects that a container is set to be hidden. In the illustrated example it is assumed that a hide/unhide button becomes selectable once a pointer is detected above a link. However, also other means to select hide/unhide may be used.

Referring to FIG. 9, when a user input setting a container to be hidden is detected in step 901, it is checked in step 902 whether or not the container is outputted in the container area. If it is, outputting the container, or at least the controls, is stopped in step 903, and the container area is updated in step 904. In some implementations outputting the controls in the container is replaced by outputting a hidden sign requiring a less wide container, as described above with FIG. 3C. Such a container may be interpreted to be a hidden container that may be displayed several times. The update may be performed as described above, using the container succeeding the "set to be hidden" container in the container order as the first one whose location changes. Further, the visibility information of the container is updated to be "hidden" in step 905. Naturally the monitoring continues, although it is not illustrated in FIG. 9.

If the container is not outputted (step 902), the process proceeds to step 905 to update the visibility information and then the monitoring continues.

In the above example hiding an active container is possible. However, in other implementations it may be that it is not allowed to hide an active container. In such implementations it may be that the selection of "hide" is disabled for the active link/container, or after selection of "hide", it is checked whether or not the link is active, and if it is, then no hiding and updating is performed. In the latter case, hide selection is ignored or it is possible to update the visibility information to indicate "hide once not any more active". It should be appreciated that in solutions in which it is possible to try to hide a fixed container, or an active container, although hiding a fixed and/or active container is not allowed, the process checks, in response to the input "hide", whether or not it is allowable to hide the container, and proceeds to step 902 only if it is allowed. Otherwise an error message is outputted.

Further, if it is allowable to hide an active container, different ways to manage the situation may be used: update a preceding non-hidden and non-fixed container or a succeeding non-hidden and non-fixed container to be the active one, or maintaining the active one as active although it is not outputted.

Figure 10:
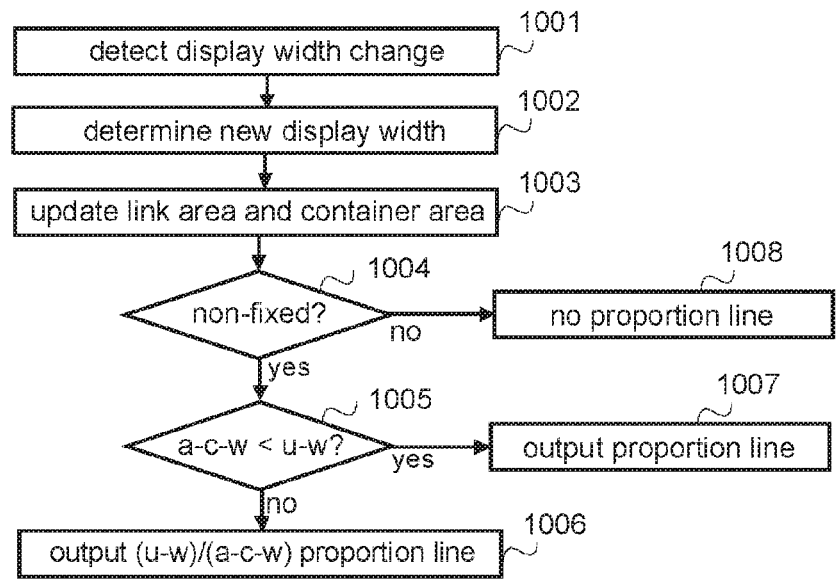

FIG. 10 illustrates an exemplary functionality of the ribbon display manager unit in a situation in which monitoring detects that the display width (d-w) of the application has been changed. The starting situation may be the one illustrated in FIG. 3B and the ending situation the one illustrated in FIG. 3E, or vice versa. In the illustrated example it is further assumed that the proportional line illustrated in FIG. 3A is displayed, i.e. the proportional line for the active link. Implementing the same principle to the proportional line illustrated in FIGS. 3B to 3E, i.e. the proportional line indicating links whose associated controls are displayed, and how much they are displayed, is a straightforward solution to one skilled in the art.

Referring to FIG. 10, when a change of the display width of the application, and hence a change of the usable width of the container area, is detected in step 1001, the new usable display width is determined in step 1002. Then the container area is updated in step 1003, for example as described above with FIG. 4A. Further, if the change affects to displayed links, also the link area is updated in step 1003.

After or while the container area is updated, it is checked in step 1004, whether or not any non-fixed containers are outputted at least partly. If yes, width (a-c-w) of the active container is compared in step 1005 with the new usable width (u-w) for non-fixed containers. If the width of the active container is not smaller than the new usable width (u-w) for non-fixed containers, only part of the proportion line is outputted in step 1006, the part indicating how much of the container is displayed. In other words, the maximum length of the proportion line is multiplied by the new usable width (u-w) and the result is divided by the width of the active container (a-c-w).

If the width of the active container is smaller than the new usable width (u-w) for non-fixed containers (step 1005) the whole container is displayed and the proportion line is outputted in step 1007 with its maximum length.

If no non-fixed container is outputted at least partly (step 1004), that means that no active container is outputted. Hence no proportion line is outputted in step 1008.

Although not illustrated in FIG. 10, after step 1006, step 1007 or step 1008, the monitoring continues.

Figure 11:
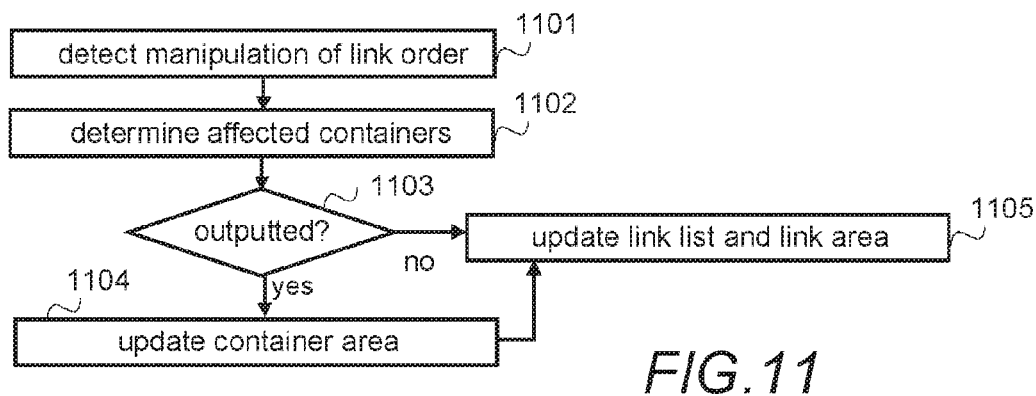

FIG. 11 illustrates an exemplary functionality of the ribbon display manager unit in a situation in which monitoring detects that the order of the links is manipulated.

Referring to FIG. 11, when a user input manipulating the link order is detected in step 1101, containers affected by the manipulation are determined in step 1102. A container is affected if it is associated with a link whose order was changed.

If at least one of the affected containers were, before the manipulation, outputted (step 1103), the container area is updated in step 1104 to correspond the new situation. The container area may be updated by updating the container order to correspond the new link order, and then performing the actual updating as described above, starting from the first affected container, or from the active container. Further, in step 1105 the link list and the link area are updated to correspond the manipulated order. Naturally after that the monitoring continues, although it is not illustrated in FIG. 11.

If none of the affected containers were, before the manipulation, outputted (step 1103), the process proceeds to step 1105 to update the link list and the link area.

Figure 12:
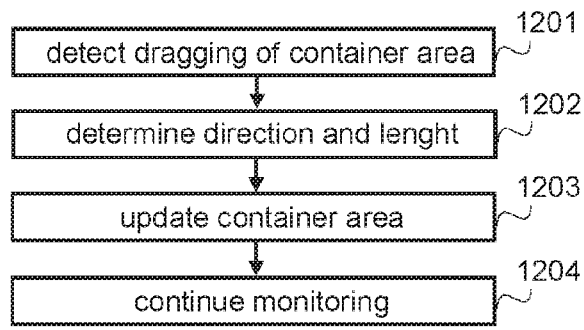

FIG. 12 illustrates an exemplary functionality of the ribbon display manager unit in a situation in which monitoring detects that the container area is dragged either to the left or to the right.

Referring to FIG. 12, when a dragging user input in the container area is detected in step 1201, the direction and the length of the dragging is determined in step 1202, and the container area is updated in step 1203. If the dragging is to the left, outputting as long a part as is the length determined in step 1202 from the leftmost side of the non-fixed outputted containers is stopped, remaining outputted containers are shifted to start at the leftmost free point, and the free area created by the shifting is "filled" by outputting succeeding, previously non-outputted containers, and/or a part of a container, if such containers exits. If the dragging is to the right, outputting as long a part as is the length determined in step 1202 from the rightmost side of the non-fixed outputted containers is stopped, remaining outputted are shifted to start at the rightmost point, and in the free area as much as possible of succeeding, previously non-outputted containers, or part of containers are outputted. Once the container area is updated, monitoring is continued in step 1204.

In another implementation, the active container is treated as a fixed container when the container area is updated because of the dragging.

Even though, at least in the full size mode, more than one container (a single sub-set of controls) is displayed, and controls displayed may be freely selected and a corresponding one or more commands are performed on the data content, finding a proper control or its container may be facilitated. Such a tool is called herein a quick launch tool.

Figure 13:
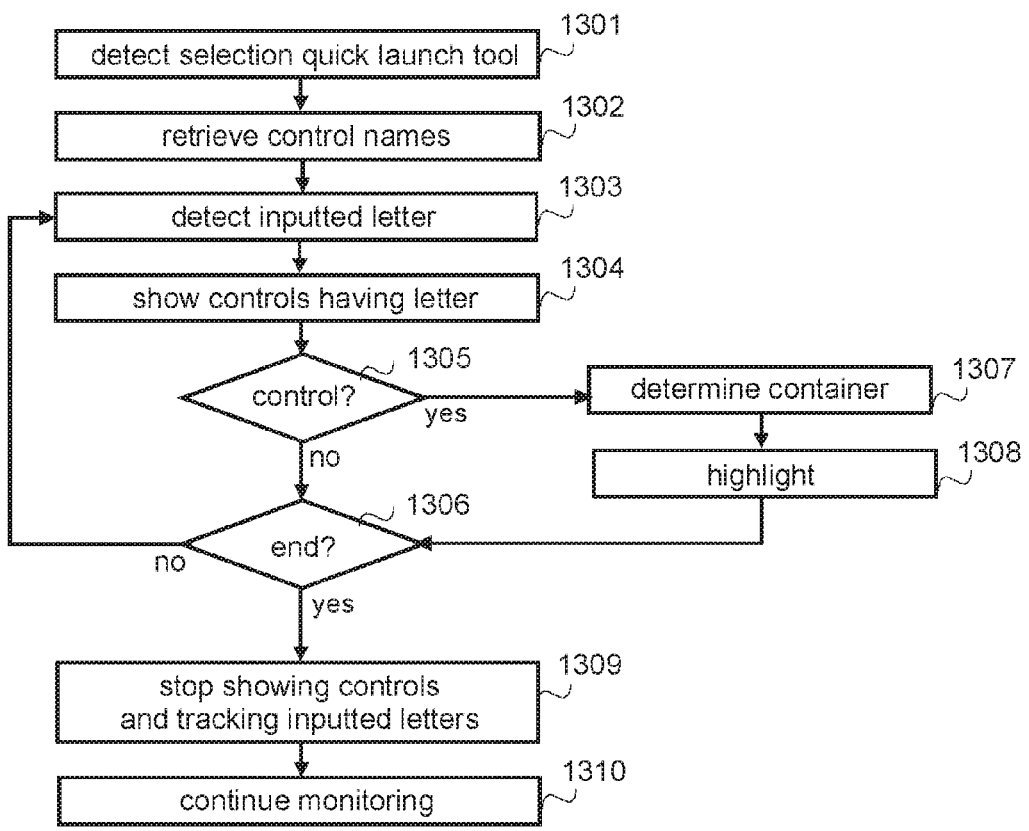

FIG. 13 illustrates an exemplary functionality of the quick launch tool. The tool may be implemented as a separate help tool unit, or as an additional feature of the ribbon display manager unit.

Referring to FIG. 13, when a user input selecting the quick launch tool is detected in step 1301, control names are retrieved in step 1302, and when an inputted letter is detected in step 1303, those control names containing the letter are shown in step 1304 to the user. If the next user input is not a selection of a name shown (step 1305) or an indication of ending the use of the quick launch tool (step 1306), it is assumed in the illustrated example, that a next letter is inputted (step 1304), and control names containing the inputted letters are shown in step 1304.

If the user input is a selection of a name (step 1305), a container comprising the control is determined in step 1307, and depending on an implementation, either the container and/or its link name and/or the control (or a group comprising the control) is highlighted in step 1308. Then, in the illustrated example, the process proceeds to step 1306 to check, whether an indication of ending the use of the quick launch tool is detected. For example, if the next user input is a selection of the highlighted control, or another control, or a link name, ending of the use of the quick launch tool is detected.

When the use of the quick launch tool is ended (step 1306), showing control names comprising the inputted letters is stopped in step 1309, and the monitoring is continued in step 1310. Naturally, if a container and/or its link name and/or a control (or a group comprising the control) is highlighted, the highlighting is also ended in step 1309.

In another implementation, when the user selects a control name, corresponding commands are also performed on the data content on the content area either in addition to steps 1307 and 1308, or instead of them, and the use of quick launch tool is ended (step 1306).

Although not described above, the displayed link area and/or the container area may be hidden, either automatically or in response to a corresponding user input, for example to have a bigger displayed data content area, for example in the same way as is known in prior art solutions.

The steps and related functions described above in FIGS. 4 to 13 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

The techniques described herein may be implemented by various means so that an apparatus implementing one or more functions/operations described above with an embodiment/example, for example by means of any of FIGS. 4 to 13 and any combination thereof, comprises not only prior art means, but also means for implementing the one or more functions/operations of a corresponding functionality described with an embodiment, for example by means of any of FIGS. 4 to 13 and any combination thereof, and it may comprise separate means for each separate function/operation, or means may be configured to perform two or more functions/operations. For example, one or more of the means and/or ribbon display manager unit for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium (s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 14:
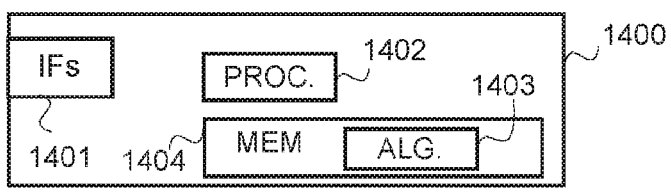
FIG. 14 is a schematic block diagram of an exemplary apparatus.

FIG. 14 is a simplified block diagram illustrating some units for an apparatus 1400 comprising of the ribbon display manager unit, or configured otherwise to perform at least some functionality described above, for example by means of any of FIGS. 4 to 13 and any combination thereof, or some of the functionalities if functionalities are distributed in the future. In the illustrated example, the apparatus comprises one or more interface (IF) entities 1401, one or more processing entities 1402 connected to various interface entities 1401 and to one or more memories 1404.

The one or more interface entities 1401 are entities for receiving and transmitting information, such as user input and what to display on one or more display devices.

A processing entity 1402 is capable to perform calculations and configured to implement at least the ribbon display manager unit described herein, or at least part of functionalities/operations described above, for example by means of any of FIGS. 4 to 13 and any combination thereof, as a corresponding unit or a sub-unit if distributed scenario is implemented, with corresponding algorithms 1403 stored in the memory 1404 The entity 1402 may include a processor, controller, control unit, micro-controller, unit, module, etc. suitable for carrying out embodiments or operations described above, for example by means of any of FIGS. 4 to 13 and any combination thereof. Generally the processor is a central processing unit, but the processor may be an additional operation processor.

A memory 1404 is usable for storing a computer program code required for the ribbon display manager unit, or a corresponding unit or sub-unit, or for one or more functionalities/operations described above, for example by means of any of FIGS. 4A to 13 and any combination thereof, i.e. the algorithms for implementing the functionality/operations described above by means of any of FIGS. 4A to 13 and any combination thereof. The memory 1404 may also be usable for storing other possible information, like the ribbon information.

To summon up, each or some or one of the units/sub-units and/or algorithms for functions/operations described herein, for example by means of means of any of FIGS. 4A to 13 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. Each or some or one of the units/subunits and/or algorithms for functions/operations described above, for example by means of means of any of FIGS. 4A to 13 and any combination thereof, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the ribbon display manager unit or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of means of any of FIGS. 4A to 13 and any combination thereof, may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

What is claimed is:

1. A method for displaying controls in an application display area of a user interface, the method comprising:
in response to a computer application starting to run:
obtaining, from a memory by a processor running the computer application, information on a plurality of links to be used with the computer application and on a display order of the plurality of links, information on a plurality of controls, a control defining one or more commands to be performed to data content processed by the computer application, each link being associated with one or more controls;
dividing a display area of the computer application on a graphical user interface into at least a link area, a container area and a data content area, the container area being a rectangular area defined by a first height less than a total height of the application display area and a first width equal to a total width of the application display area;
starting to display in the link area a plurality of links;
determining a container for each link that is displayed, the container being a rectangular display area for displaying one or more of the plurality of controls associated with the link, the rectangular display area being defined by a second height equal to the first height and a second width less than the first width;
determining at least for each control associated with a link that is displayed, a display size;
displaying in the container area at least a container corresponding to a first link in the display order of the plurality of links and one or more successive containers corresponding to one or more successive links according to the display order of the plurality of links, each displayed control being selectable when displayed; and
monitoring user inputs to the running computer application while the selectable controls are displayed in at least two different containers that are simultaneously displayed:
in response to detecting a user input that selects any of the plurality of controls displayed in any of the displayed containers, performing corresponding one or more commands to the data content in the data content area while maintaining the link area, the container area, and the plurality of controls displayed in the container area unchanged; and
in response to detecting a user input selecting a link that is displayed in the link area and whose associated container is not displayed or is only partly displayed in the container area, determining the area needed for the container of the selected link in the container area, displaying at least a portion of the container of the selected link in the container area that will fit in the container area and, according to the display order of the links, at least a portion of one or more containers of successive links with corresponding one or more controls that will fit in the container area not occupied by the container of the selected link; and
in response to detecting a user input changing the width of the application display area, updating the container area to display a number of containers that will fit in the display area at least partly after the width of the application display area has been changed without changing the display size of the displayed controls and the displayed containers.

2. The method of claim 1, wherein one of the links is an active link, and a container associated with the active link is an active container, the method further comprising displaying containers in the container area so that the active container is displayed in a specific spot of the container area.

3. The method of claim 2, wherein the display area is divided so that the container area is horizontally above the data content area and the specific spot is alignment to left, and the method further comprises displaying after the active container at least a portion of one or more containers that will fit into the container area according to the display order of the links, starting from the active link.

4. The method of claim 2, further comprising updating, in response to a user input selecting a non-active link to be the active link, the container area to display in the specific spot a container associated with the non-active link selected, and updating the other container area accordingly, using the non-active link selected as the active link.

5. The method of claim 1, further comprising updating the displayed containers in response to a user input indicating hiding a displayed container by stopping displaying the container or at least the controls in the container.

6. The method of claim 5, further comprising updating the displayed containers in response to a user input indicating that a hidden container should be visible to display the container if at least part of the container will fit into the container area according to the display order of the links.

7. The method of claim 1, the method further comprising:
updating, in response to a user input changing the order of the displayed links, the container area to display at least a portion of one or more containers that-will fit in the display area according to a new order of the displayed links;
moving, in response to a user input dragging the container area, the containers displayed accordingly causing at least part of a container displayed before the dragging not to be displayed after the dragging and to display at least a portion of one or more containers not displayed before the dragging that will fit at least partly in the display area corresponding to the dragging.

8. The method of claim 1, the method further comprising:
reserving from the container area one or more fixed spaces, each fixed space comprising one or more controllers that are associated with the corresponding fixed space; and
using the unreserved container area for displaying the containers.

9. The method of claim 1, wherein the container area and the display area of the running computer application are equally wide.

10. The method of claim 1, further comprising:
outputting a search tool for controls in the display area;
indicating, in response to a user input into the search tool, one or more controls corresponding to the user input and/or one or more containers comprising the one or more controls corresponding to the user input and/or one or more links with which the one or more controls corresponding to the user input are associated.

11. An apparatus for displaying controls in an application display area of a user interface, comprising:
at least one processor, and
at least one memory including a computer program code, wherein the at least one memory and the computer program code are configured, with the at least one processor, to cause the apparatus to:
obtain, from the at least one memory by the at least one processor in response to a computer application starting to run, at least information on a plurality of links to be used with the computer application and on a display order of the plurality of links, information on a plurality of controls, a control defining one or more commands to be performed to data content processed by the computer application, each link being associated with one or more controls;
generate for each link a link portion to be displayed;
generate for each link a container to display one or more selectable controls that are associated with the link by determining for each container and for each control a display size;
cause a display area of a computer application on a graphical user interface to be divided into at least a link area, a container area and a data content area, the container area being a rectangular area defined by a first height less than a total height of the application display area and a first width equal to a total width of the application display area;
cause to display on the graphical user interface in the link area in a display order of the links a number of links that will fit at least partly into the link area;
determine how the container is displayed, the container being a rectangular display area for displaying one or more of the plurality of controls associated with the link, the rectangular display area being defined by a second height equal to the first height and a second width less than the first width;
determine at least for each control and container associated with a link that is displayed a display size;
cause to display on the graphical user interface in the container area at least a container corresponding to a first link in the display order of the plurality of links and one or more successive containers corresponding to one or more successive links according to the display order of the plurality of links, each displayed control being selectable when displayed;
perform, in response to detecting a user input selecting any of the controls displayed in any of the displayed containers while the selectable controls are displayed in at least two different containers that are simultaneously displayed, corresponding one or more commands to the data content in the data content area while maintaining what is displayed in the link area and the container area unchanged; and
update, in response to detecting a user input selecting a link that is displayed in the link area and whose associated container is not displayed or is only partly displayed in the container area while the computer program is running, what is displayed in the container area, by determining the area needed for the container of the selected link and causing to display at least a portion of the container of the selected link in the container area that will fit in the container area and, according to the display order of the links, at least a portion of one or more containers of successive links with corresponding one or more controls that will fit in the container area not occupied by the container of the selected link; and
update, in response to detecting a user input changing the width of the application display area, the container area to display a number of containers that will fit in the display area at least partly after the width of the application display area has been changed without changing the display size of the displayed controls and the displayed containers.

12. The apparatus of claim 11, wherein the at least one memory and the computer program code are further configured, with the at least one processor, to cause the apparatus to:
update the displayed containers in response to a user input indicating hiding a displayed container by stopping displaying the container or at least the controls in the container; and
update the displayed containers in response to a user input indicating that a hidden container should be visible to display the container if at least part of the container will fit into the container area according to the display order of the links.

13. The apparatus of claim 11, wherein the at least one memory and the computer program code are further configured, with the at least one processor, to cause the apparatus to update, in response to a user input changing the size of the application area perpendicular to the direction the display area is divided, the container area to display at least a portion of one or more containers that will fit in the display area at least partly after the size of the application area has been changed.

14. The apparatus of claim 11, wherein the at least one memory and the computer program code are further configured, with the at least one processor, to cause the apparatus to update, in response to a user input changing the order of the displayed links, the container area to display at least a portion of one or more containers that will fit at least partly in the display area according to a new order of the displayed links.

15. The apparatus of claim 11, wherein the at least one memory and the computer program code are further configured, with the at least one processor, to cause the apparatus to:
reserve from the container area one or more fixed spaces, each fixed space comprising one or more controllers that are associated with to the corresponding fixed space; and
use the unreserved container area for displaying the containers.

16. A non-transitory computer-readable program storage medium with a computer program product for displaying controls in an application display area of a user interface and comprising program instructions which, when run on a computing apparatus, causes the computing apparatus to:
obtain, from the at least one memory by the at least one processor in response to a computer application starting to run, at least information on a plurality of links to be used with the computer application and on a display order of the plurality of links, information on a plurality of controls, a control defining one or more commands to be performed to data content processed by the computer application, each link being associated with one or more controls;
generate for each link a link portion to be displayed;

generate for each link a container to display one or more selectable controls that are associated with the link by determining for each container and for each control a display size;

cause a display area of a computer application on a graphical user interface to be divided into at least a link area, a container area and a data content area, the container area being a rectangular area defined by a first height less than a total height of the application display area and a first width equal to a total width of the application display area;

cause to display on the graphical user interface in the link area in a display order of the links a number of links that will fit at least partly into the link area;

determine how the container is displayed, the container being a rectangular display area for displaying one or more of the plurality of controls associated with the link, the rectangular display area being defined by a second height equal to the first height and a second width less than the first width;

determine at least for each control and container associated with a link that is displayed a display size;

cause to display on the graphical user interface in the container area at least a container corresponding to a first link in the display order of the plurality of links and one or more successive containers corresponding to one or more successive links according to the display order of the plurality of links, each displayed control being selectable when displayed;

perform, in response to detecting a user input selecting any of the controls displayed in any of the displayed containers while the selectable controls are displayed in at least two different containers that are simultaneously displayed, corresponding one or more commands to the data content in the data content area while maintaining what is displayed in the link area and the container area unchanged; and update, in response to detecting a user input selecting a link that is displayed in the link area and whose associated container is not displayed or is only partly displayed in the container area while the computer program is running, what is displayed in the container area, by determining the area needed for the container of the selected link and causing to display at least a portion of the container of the selected link in the container area that will fit in the container area and, according to the display order of the links, at least a portion of one or more containers of successive links with corresponding one or more controls that will fit in the container area not occupied by the container of the selected link; and update, in response to detecting a user input changing the width of the application display area, the container area to display a number of containers that will fit in the display area at least partly after the width of the application display area has been changed without changing the display size of the displayed controls and the displayed containers.

17. The non-transitory computer-readable program storage medium of claim 16, with the computer program product comprising further program instructions which, when run on a computing apparatus, causes the computing apparatus to:
update the displayed containers in response to a user input indicating hiding a displayed container by stopping displaying the container or at least the controls in the container; and
update the displayed containers in response to a user input indicating that a hidden container should be visible to display the container if at least part of the container will fit into the container area according to the display order of the links.

18. The non-transitory computer-readable program storage medium of claim 16, with the computer program product comprising further program instructions which, when run on a computing apparatus, causes the computing apparatus to update, in response to a user input changing the size of the application area perpendicular to the direction the display area is divided, the container area to display at least a portion of one or more containers that will fit in the display area at least partly after the size of the application area has been changed.

19. The non-transitory computer-readable program storage medium of claim 16, with the computer program product comprising further program instructions which, when run on a computing apparatus, causes the computing apparatus to update, in response to a user input changing the order of the dis-played links, the container area to display at least a portion of one or more containers that will fit at least partly in the display area according to a new order of the displayed links.

20. The non-transitory computer-readable program storage medium of claim 16, with the computer program product comprising further program instructions which, when run on a computing apparatus, causes the computing apparatus to:
reserve from the container area one or more fixed spaces, each fixed space comprising one or more controllers that are associated with to the corresponding fixed space; and
use the unreserved container area for displaying the containers.

* * * * *